United States Patent [19]

Elia

[11] Patent Number: 5,317,670
[45] Date of Patent: May 31, 1994

[54] HOT WATER STORAGE SYSTEM

[76] Inventor: Paul Elia, 68 Hazelton Avenue, Toronto, Ontario, Canada, M5R 2E2

[21] Appl. No.: 963,587

[22] Filed: Oct. 19, 1992

[30] Foreign Application Priority Data

Oct. 19, 1991 [GB] United Kingdom .................. 9122220

[51] Int. Cl.$^5$ .............................................. F24H 1/18
[52] U.S. Cl. .................... 392/464; 126/362; 236/1 E
[58] Field of Search ............... 237/8 R, 8 C; 236/1 E; 122/448 B; 392/464, 463, 449, 450, 441; 219/441, 442, 428, 430, 437; 126/362

[56] References Cited

U.S. PATENT DOCUMENTS

| | | |
|---|---|---|
| 2,814,279 | 11/1957 | Thomas . |
| 4,438,728 | 3/1984 | Fracaro . |
| 4,534,321 | 8/1985 | Rydborn ........................ 237/8 R X |
| 5,027,749 | 7/1991 | Cifaldi . |

FOREIGN PATENT DOCUMENTS

| | | |
|---|---|---|
| 0104362 | 4/1984 | Fed. Rep. of Germany . |
| 3330478 | 3/1985 | Fed. Rep. of Germany . |
| 2486212 | 1/1982 | France . |
| 2507749 | 12/1982 | France . |
| 4169742 | 6/1992 | Japan ................................. 392/464 |
| 4194550 | 7/1992 | Japan ................................. 392/464 |
| WO8204370 | 12/1982 | PCT Int'l Appl. . |
| 218796 | 7/1924 | United Kingdom . |
| 5800618 | 8/1946 | United Kingdom . |
| 1358996 | 7/1974 | United Kingdom . |
| 1429317 | 3/1976 | United Kingdom . |
| 2225097 | 5/1990 | United Kingdom . |

*Primary Examiner*—Henry A. Bennett
*Attorney, Agent, or Firm*—Knobbe, Martens, Olson & Bear

[57] ABSTRACT

A hot water system for connection to a water supply and a local hot water usage system, comprising a plurality of series-connected reserve tanks and demand tanks for receiving water from the water supply, heating the received water to a desired temperature within the reserve and demand tanks, and supplying the heated water to the local hot water usage system as it is demanded. A controlling device is provided for sequencing the operation of the reserve and demand tanks relative to peak power consumption hours and off-peak hours. Specifically, each of the tanks is provided with one or more thermostats which are selectively enabled or disabled by the controlling device at predetermined times. The one or more thermostats are, in turn, connected to one or more heating coils or maintenance coils. The reserve tanks and demand tanks may be operated under control of the controlling device in any of three modes, as follows: maintenance mode, enable mode, and disable mode. In maintenance mode, the water is maintained at a desired temperature either via enabling a thermostat which is connected to a low-power maintenance coil and disabling the heating coil thermostats, or via cycling power through the heating coil thermostats if no maintenance coil is provided. In enable mode, the heating coil thermostats are enabled so that the water temperature may be increased in a tank via activation of the heating coils under thermostat control, and if a maintenance coil is provided then the maintenance coil thermostat is disabled. In disable mode, the heating coil thermostats, and associated heating coils, are disabled to minimize power consumption. If the tank is provided with a maintenance coil, then the maintenance coil thermostat and associated maintenance coil are also disabled when the tank is operating in disable mode.

11 Claims, 1 Drawing Sheet

HOT WATER STORAGE SYSTEM

FIELD OF THE INVENTION

This invention relates in general to energy conservation systems, and more particularly to a novel hot water storage system in which power consumption to heat hot water is deferred to off-peak hours.

BACKGROUND OF THE INVENTION

Prior art systems are known for storing and heating water in a plurality of storage tanks. For example, U.S. Pat. No. 5,027,749 (Cifaldi) teaches a multi-stage high efficiency gas fired water heater which includes a lower storage tank and upper recovery tank. Cold water is provided through an inlet into the recovery tank and heated water is removed via an outlet from the storage tank. Hot water from the top tank is supplied to the bottom tank via a conduit, and the top tank is, in turn, filled with cold water. The recovery and storage tanks are interconnected to transfer heated water from the recovery tank to the storage tank. Both tanks are heated to a maximum temperature during off-peak hours and the heated water is used during peak power consumption hours.

U.S. Pat. No. 4,438,728 (Fracaro) discloses three vertically stacked tanks. The upper tank has an incoming cold water inlet for directing incoming cold water toward the bottom of the tank. After the water is pre-warmed in the upper tank, the pre-warmed water passes out of the upper tank into the bottom of the intermediate tank. After further pre-warming in the intermediate tank, the water exits the intermediate tank and is directed toward the bottom of the lower tank. After reaching its hottest temperature in the lower tank, the hot water in the lower tank exits through the top of that tank.

Prior art systems are also known for enabling and disabling hot water heating coils in order to conserve energy consumption during peak power consumption hours. For example, published PCT international patent application number WO/PCT/US82/00756 (Vapor Corporation) discloses master and slave tanks which are disposed side-by-side and are controlled by a temperature controller and energized during "off-peak" hours by conventional controls to heat the storage fluid in both tanks to a high temperature.

It is well known that the peak power consumption hours occur on weekdays between, for example, 7:00 a.m. and 9:00 p.m., in many industrialized areas of the world, although the peak power consumption hours may vary from one location to another. Research indicates that one of the most significant contributors to peak power consumption is the well-known domestic hot water heater. Specifically, hot water consumption is maximized during the morning peak power consumption hours as a result of showers, washing etc., and in the evening peak power consumption hours through use of dish washing machines, laundry, etc.

Thermostat-controlled heating coils are often utilized to maintain the water temperature in a storage tank at a suitable level, and, once the temperature falls below that level, one or more heating coils are activated by the thermostats to increase the temperature to the present thermostat value, irrespective of the time of day.

It is known in the prior art to use timers and microprocessors for disabling thermostat-controlled hot water heaters at specific times. However, it in believed that such systems have only been used to enable or disable all of the thermostats at the same time, and not according to any predetermined sequencing of operation.

Since hydroelectric, nuclear and other electric power is generated at a continuous rate, there is considerable interest among federal-, provincial- and/or state-owned utilities to reduce power consumption during the peak power consumption hours and to defer the power consumption to off-peak hours.

There is no teaching or suggestion in the prior art systems of any means to separately heat multiple hot water tanks at different times during the off-peak hours. The systems of Cifaldi and Fracaro utilize structure which contemplates only heating both tanks simultaneously, albeit to different temperatures. Likewise, the PCT international application of Vapor Corporation teaches the use of two independent temperature controllers associated with two separate water heating tanks which are said to be energized during off-peak hours. However, there is no suggestion of enabling the two heaters for independent operation during off-peak hours for use in a hot water storage and delivery system. Such operation would not be consistent with the provision of lending energy to the water-based central heating system disclosed in the Vapor Corporation application.

Other general interest prior art is known, as follows: European patent application number EP 0 104 362, French patent application number 2,486,212; British Patent No. 1,429,317; French patent application 2,507,749; DE 330478; U.K. patent application number GB 2,225,097; Canadian patent number 1,210,426; British patent number 218,796; British patent number 251,465; British patent number .580,061, U.S. Pat. No. 2,814,279, British patent number 1,358,996.

SUMMARY OF THE INVENTION

According to the present invention, a novel hot water storage and heating system is provided in which adequate amounts of hot water are supplied to the consumer during peak power consumption hours (e.g. weekdays from 7:00 a.m. to 9:00 p.m.), and yet power consumption by the system for heating the water is deferred to off-peak hours and the water is maintained at a desired temperature via low-power heating.

More particularly, according to the present invention, two or more hot water tanks are provided which are connected in series, wherein the first tanks in line with the water supply are referred to herein as "reserve tanks", and the tanks which are closest to the point of water utilization are referred to herein as "demand tanks". Any number of tanks may be used to perform the functions of the "reserve tanks" and the "demand tanks", and in some situations one or more tanks may function as "reserve tanks" at certain times and as "demand tanks" at other times. In the event that hot water has been recently demanded, as described in greater detail below, the water in the tanks is heated to a desired temperature during off-peak hours on selected days, and the heated water may then be utilized. As the hot water from the demand tanks is used, hot water from the reserve tanks is supplied to the demand tanks to replace the hot water used, via one or more conduits. The reserve tanks are, in turn, filled with cold water. Therefore, sufficient hot water is available within the system, for use during the morning and evening peak power consumption hours.

Each tank is provided with one or more thermostat-controlled heating coils, and a controlling device is provided for enabling the one or more thermostats of each tank at specific times. A single controlling device may be provided for controlling all thermostats in the system, or each tank may be provided with its own controlling device.

The reserve tanks and demand tanks may be operated under control of the controlling device in any of three modes, as follows: maintenance mode, enable mode, and disable mode. In maintenance mode, the water is maintained at a desired temperature either via enabling a thermostat which is connected to a low-power maintenance coil and disabling the heating coil thermostats, or via pulsing power through the heating coil thermostats if no maintenance coil is provided. As a result of pulsing power through the thermostats, the power demand on the utility is averaged out over time. In enable mode, the heating coil thermostats are enabled so that the water temperature may be increased in a tank via activation of the heating coils under thermostat control, and if a maintenance coil is provided then the maintenance coil thermostat is disabled. In disable mode, the heating coil thermostats, and associated heating coils, are disabled to minimize power consumption. If the tank is provided with a maintenance coil, then the maintenance coil thermostat and associated maintenance coil are also disabled when the tank is operating in disable mode.

In operation, during peak power consumption hours, the reserve tanks are operated in disable mode while the demand tanks are operated in maintenance mode, thereby minimizing power consumption. At the onset of the off-peak hours, the demand tanks begin operating in enable mode while the reserve tanks remain in disable mode. Once the water in the demand tanks reaches the desired temperature, the temperature is maintained via normal operation of the thermostats while the tank is operating in the enable mode. However, the controlling device can be programmed for pulsing power through the thermostats, as can be done in the maintenance mode (discussed above). At a predetermined time prior to onset of the morning peak power consumption hours, and in time sufficient to heat the water in the reserve tanks prior to usage, and provided that hot water has been demanded within a predetermined period, the reserve tanks begin operating in enable mode for heating the water therein, and the demand tanks begin operating in maintenance mode. As discussed above, at the onset of the peak power consumption period, the controlling device causes the reserve tanks to revert to disable mode of operation and the demand tanks to continue to operate in maintenance mode.

By enabling the reserve and demand tanks at different times, the demand for power in the system of the present invention is spread out over the off-peak hours rather than being concentrated during either the peak power consumption hours or the off-peak hours. Prior to the morning peak power consumption hours (e.g. prior to approximately 7:00 a.m. to 9:00 a.m., but may vary), the water in both the reserve tanks and the demand tanks has been heated to the desired temperature, provided there has been demand for hot water within a predetermined time before the onset of the peak power consumption hours. At other times (e.g. outside of the peak hot water consumption hours, on weekends and holidays, but not in the predetermined period prior to the peak power consumption hours, for example from, 5:00 a.m. to 7:00 a.m.), the demand tanks operate in enable mode.

BRIEF DESCRIPTION OF THE DRAWINGS

A detailed description of the preferred embodiment is provided below with reference to the sole Figure which depicts a hot water system according to the present invention.

DETAILED DESCRIPTION OF THE PREFERRED EMBODIMENT

Figure 1:
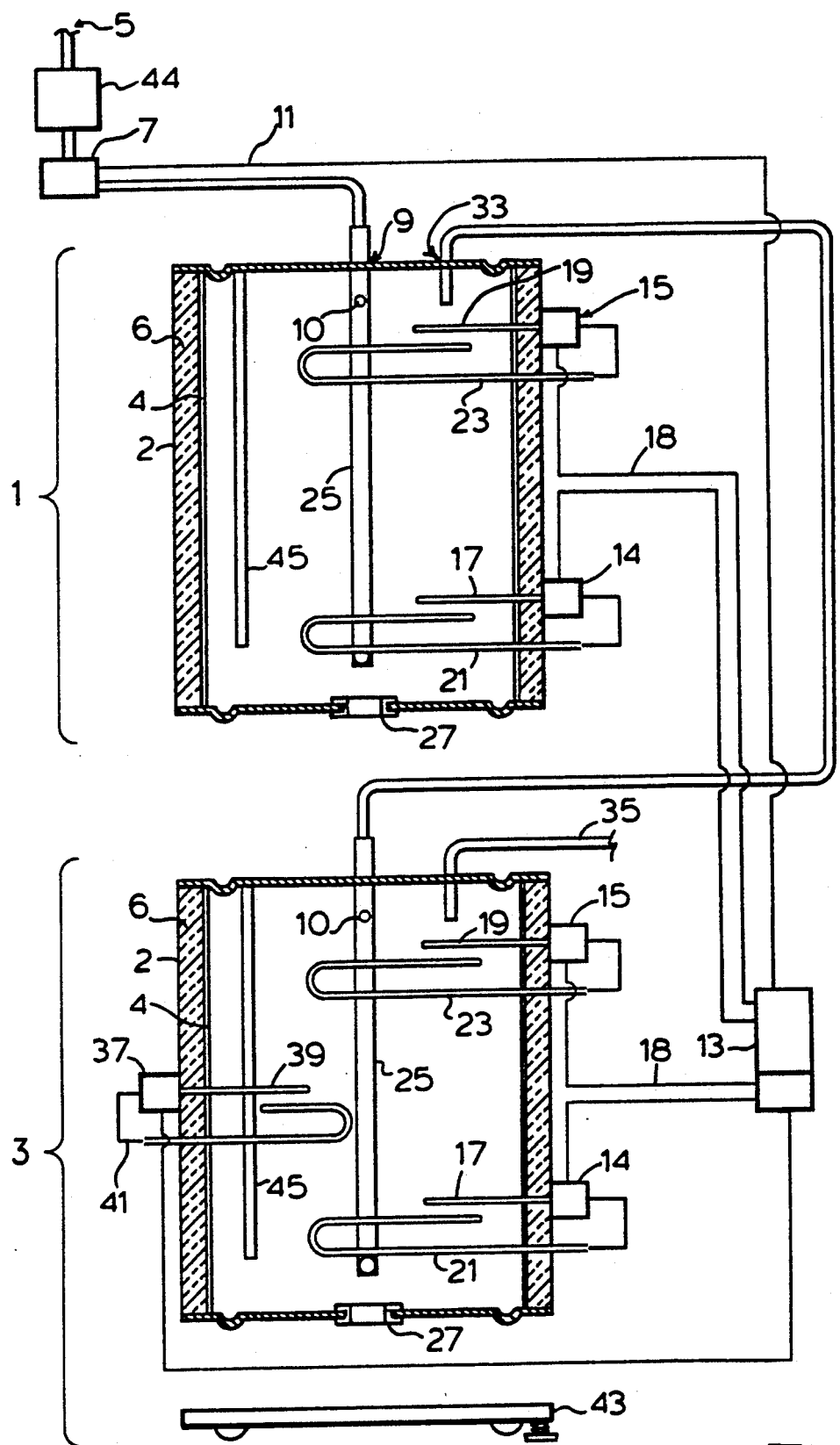

With reference to the enclosed Figure, a two-part hot water heater is shown comprising a reserve tank 1 and a demand tank 3, although additional tanks may be connected depending on water storage requirements. Each of the tanks 1 and 3 is preferably capable of storing a sufficient amount of hot water for domestic use during peak power consumption hours (e.g. 40 gallons for a small family). Each of the tanks 1 and 3 comprises an outer shell 2, a liner 4 and insulation 6. It is contemplated that the outer shell 2 may be made of plastic or steel, the liner 4 may be made of plastic or glass, depending on the method of construction, and the insulation 6 may be of fibre, plastic and/or other compatible insulating material for the reduction of heat loss, in a well known manner. A combination of the above-materials, or other materials suitable for the shell 2, liner 4 and insulation 6 may be utilized provided they meet the requirements of government authorities and the demands of the hot water system.

Cold water is received from the water supply mains via an inlet pipe 5. The water passes through metering device 7, and is introduced to the reserve hot water tank 1 via an inlet 9. The water which is introduced into reserve tank 1 may be supplied from the water mains directly or may be supplied after pre-heating via solar, or other passive or active heating means. Inlet pipe 5 is preferably provided with a back-flow preventer 44, or other means, whose function is to prevent water from being released out of the tank inlet in the event that the supply of water to either of the hot water tanks 1 or 3 has been interrupted. As described in greater detail below, anti-siphoning means may also be provided directly in each of the tanks, in which case the back-flow preventer 44 can be omitted or can be provided as an additional safeguard against damage to the system.

Where a metering device 7 is provided, the metering device is preferably connected via electrical wiring 11 to a controlling device 13, such as a microprocessor, timer, etc., which enables and disables the thermostats by directly or indirectly regulating the application of AC or DC power thereto. Where the controlling device 13 is a mechanical timer, power may flow to the thermostats 14 and 15 through the timer, as shown in the sole figure. Alternatively, where the controlling device 13 is a microprocessor, power may be applied to the thermostats 14 and 15, and the thermostats may be activated via a further electrical wire (not shown), extending from the controlling device 13 to the thermostats 14 and 15. The metering device 44 can provide data to the controlling device 13 concerning the flow of water into the reserve tank 1 from the water mains. As described in greater detail below, this data may be utilized by the controlling device 13 for determining whether there has been a demand for hot water within a predetermined period of time.

In the illustrated embodiment, the controlling device 13 is connected to a combination of thermostats 14 and 15 in each of the tanks 1 and 3, via suitable electric wiring 18. The thermostats 14 and 15 are, in turn, connected to temperature probes 17 and 19, respectively. Each of the tanks 1 and 3 is also provided with heating coils 21 and 23 for heating the water therein, in a well known manner.

As indicated above, the controlling device 13 selectively enables and disables the thermostats 14 and 15 according to the programmed mode of operation of the tank (i.e. enable mode, disable mode, or maintenance mode). When a tank is operating in enable mode, under control of the controlling device 13, the thermostats 14 and 15 activate the heating coils 21 and 23 in order to heat the water within the tanks 1 and 3, and de-activate the coils 21 and 23 once the desired water temperature is reached. The probes 17 and 19 are preferably located in close proximity to each of coils 21 and 23, respectively, for sensing the temperature of the water and transmitting this information to the associated thermostats 14 and 15, in order for the thermostats to properly activate and deactivate the heating coils 21 and 23.

As described in greater detail below, the controlling device 13, (e.g. microprocessor, electronic timer, mechanical timer, or other system), functions to enable or disable the appropriate thermostats 14 and 15 on a timely basis, as required to effect predetermined scheduling of the operating modes. In this regard, where the controlling device 13 is a microprocessor, the microprocessor may execute a program, or where the controlling device 13 is an electronic timer or mechanical timer, the timer may be set to control the timing of activation of the thermostats 14 and 15. Furthermore, the controlling device 13 may be programmed to interrupt the supply of power to the thermostats 14 and 15 in the event that there has been no water demanded from the hot water heating system over a predetermined period of time.

According to the embodiment shown, a single controlling device 13 is provided for controlling all thermostats in the system. However, it is contemplated that more than one such device may be used (e.g. one controlling device may be provided for each tank).

It is also contemplated that the power rating of the heating coils 21 and 23 may vary depending upon the capacity of the tanks being heated and the location of the coils within the tanks. However, it is expected that standard 3.8 KW heating coils will be utilised in A.C. current areas.

Suitable openings are provided in the tanks 1 and 3 for the electrical heating coils 21 and 23, such openings being located close to the base and to the top of the tanks. However, more or fewer openings may be required depending on the configuration of the system, and the position of the openings may vary according to manufacturing tolerances appropriate to the fabrication material, thermal efficiency, et. The heating coils 21 and 23 are secured in the appropriate position by bolting or by threading them into place using appropriate gasket material to prevent leakage, in a well known manner.

As with the heating coils 21 and 23, appropriate apertures or openings are provided for the thermostat temperature probes 17 and 19, and the probes are secured in place in a well known manner.

Water supplied to the inlet 9 of each tank 1 and 3 is delivered to the bottom part of the tank via dip tube 25, which is preferably equipped with an anti-siphoning aperture 10, in a well known manner, for minimizing the likelihood of the water level in the tank dropping below the level of the heating coils 21 and 23. The spout or orifice at the end of the dip tube 25 is positioned in such a way as to stimulate movement of particulate matter which can collect on the bottom of the tank over time, so that the particulate matter flows out of the tank with the water. Alternatively, the water may be supplied to the bottom of the tank via an opening 27 at the base of the tank 1, in which case, the opening may be constructed in such a manner as to stimulate movement of the particulate matter.

Hot water from the top of reserve tank 1 is conveyed to the bottom of the demand tank 3 via a conduit 31. Hot water is withdrawn from the tank 3 via outlet 33 and domestic piping 35, for use in the dwelling. Check valves, drains and other standard plumbing apparatus are not shown in the Figure, for the sake of simplicity.

As indicated above, the construction of the tank 3 is similar to that of tank 1, but may vary in certain respects, such as water storage capacity. However, in the embodiment illustrated, demand tank 3 is provided with an additional thermostat 37 connected to controlling device 13, for operating low-power maintenance coil 41 so as to maintain the desired temperature of water in the demand tank during the maintenance mode of tank operation. The thermostat 37 is also connected to a temperature probe 39, in a well known manner. In the preferred embodiment, the maintenance coil 41 is activated during maintenance mode at the same time as the heating coils 21 and 23 are de-activated.

It is also contemplated that the power rating of the maintenance coil 41 may vary depending upon the capacity of the tanks and the location of the maintenance coil within the tanks.

Furthermore, variations in positioning of the maintenance coil, location of the openings for the thermostat 37 and temperature probe 39, etc., are possible in the same way as discussed above with reference to the heating coils 21 and 23.

As an alternative, the maintenance coil 41 may be omitted, and the thermostats 14 and 15 of demand tank 3 may be supplied with cycling electrical energy, or by other means, in order to limit the power consumption consistent with demand requirements specified by the power utility.

As is apparent from the sole Figure, both of the tanks 1 and 3 are connected in series and are provided in a vertical stacking arrangement.

Since the reserve tank 1 and demand tank 3 are vertically stacked, water may be provided from the reserve tank 1 to the demand tank 3 via gravity feed with or without the use of pumps, etc.

As an alternative to providing separate vertically stacked tanks 1 and 3, it is contemplated that the system may be implemented in a single tank with separated, series connected compartments therein.

As shown in the Figure, a stand 43 is provided for supporting the vertical stack of tanks 1 and 3. Furthermore, each tank may be provided with protrusions from the bottom surface thereof and corresponding shaped indentations on the top surface thereof such that the protrusions from the bottom of tank 1 are received in the cooperatively shaped indentations on the top of tank 3, to facilitate stable vertical stacking of the tanks. It is also contemplated that an additional stand, similar in design to the stand 43, may be used to separate the tanks 1 and 3.

The following is a description of a typical usage scenario for a typical weekday where hot water has been previously demanded within a predetermined period. At other times (e.g. outside of the peak hot water consumption hours, on weekends and holidays, but not in the predetermined period prior to the peak power consumption hours, for example from, 5:00 a.m. to 7:00 a.m.), the demand tank 3 operates in enable mode. Prior to the morning peak power consumption hours (e.g. prior to approximately 7:00 a.m. to 9:00 a.m., but may vary), the water in both the reserve tank 1 and demand tank 3 has been heated to the desired temperature, as discussed in greater detail below. Therefore, during the morning peak power consumption hours, hot water from the demand tank 3 may be utilized domestically for showers, washing, etc. As discussed above, the tank 3 is of suitable volume to store sufficient hot water for the desired application (e.g. 40 gallons for a small family, larger capacity for larger families, or for industrial, hotel applications, etc). As hot water from the demand tank 3 is used, the supply of hot water used is replenished with hot water from the supply in reserve tank 1, and the temperature of the water in demand tank 3 is maintained as a result of the controlling device 13 causing the tank 3 to operate in the maintenance mode.

As discussed above, the cold water entering reserve tank 1 is not heated during peak power consumption hours, as a result of the controlling device 13 causing tank 1 to operate in the disable mode. Therefore, the heating system according to the present invention utilizes minimal power during peak power consumption hours.

Controlling device 13 enables thermostats 14 and 15 in the demand tank 3 upon the onset of the off-peak hours (e.g. starting at approximately 9:00 p.m.) while the thermostats in the reserve tank 1 remain disabled (i.e. reserve tank is operating in disable mode). Prior to the beginning of the next morning peak power consumption period in time sufficient to heat the water in the reserve tank 1 prior to usage (e.g. between 5:00 a.m. and 7:00 a.m.), and provided that hot water has been previously demanded within a predetermined period, the heating coils 21 and 23 in reserve tank 1 are activated while the demand tank 3 simply maintains the heated water temperature via the maintenance mode of operation.

According to the present invention, it is also contemplated that the controlling device 13 may be programmed such that, if no hot water is demanded during a predetermined time period (e.g. 24 hours), then the thermostats 14 and 15 in tank 1 and/or 3 will be disabled. The reserve tank heating coils 31 and 23 will thus only be enabled once hot water is actually demanded, and the associated thermostats 14 and 15 have been enabled by the controlling device 13. Furthermore, in certain applications (e.g. cottages, etc.) where only a single demand tank 3 may be employed, controlling device 13 can be programmed to disable all thermostats within the system if no hot water is demanded during a predetermined time period. This procedure may be effected either by the controlling device 13 monitoring the frequency of demand, as indicated by operation of thermostats 14 and 15, or by means of monitoring the amount of water flowing into the system through metering device 7, or other suitable means.

It is also contemplated that the controlling device 13 may be equipped with communication means such as modem, co-axial cable or radio receiver, so that the thermostats may be further controlled, limited, shut-off, monitored or adjusted by the local power utility which supplies electrical energy to the hot water tank system.

It is contemplated that the power supply to the thermostats and heating/maintenance coils may be disabled or interrupted if the temperature of water rises above predetermined alarm limits. This fail-safe aspect of the system may also be connected to a suitable alarm circuit for indicating conditions in which temperature of the coils has risen above predetermined alarm limits.

For periodic removal of debris in a tank, a cleanout drainage hole is preferably provided (not shown) at the lower portion of each tank.

In circumstances where corrosion may be a problem, particularly in tanks where metal structures are used, a sacrificial anode 45 may be placed in the tank.

The tanks 1 and 3 are also preferably provided with a pressure release valve, not shown, that opens in the event that pressure within the tank reaches an unacceptable level, according to conventional technology.

Other modifications and variations of the invention are possible. For example, alternative active or passive energy sources (e.g. solar heating, gas fired heating, heat pump, etc.) may be utilized to either preheat the water before it gets to the demand tank 3, or as discussed above, may be utilized to heat the water in both tanks. In addition, instead of arranging the tanks vertically with gravity feed from the reserve tank 1 and demand tank 3, it is contemplated that the two or more tanks may be disposed side-by-side.

All such modifications and variations are believed to be within the sphere and invention as defined by the claims appended hereto.

The embodiments of the invention in which an exclusive property of privilege is claimed are defined as follows:

1. A hot water system for connection to a water supply and a local hot water usage system, for minimizing power consumption during peak power consumption hours and apportioning power consumption during off-peak hours, comprising:
   a) a first hot water tank having an inlet and an outlet, said inlet being connected to said water supply for receiving water therefrom into said first tank;
   b) a second hot water tank having an inlet connected to said outlet from said first hot water tank for receiving water from said first tank into said second tank, and an outlet for discharging water from said second tank to said local hot water usage system;
   c) first heating means disposed in said first hot water tank for heating water therein;
   d) second heating means disposed in said second hot water tank for heating water therein;
   e) controller means connected to said first heating means and to said second heating means for:
      i) disabling said first heating means and said second heating means during said peak power consumption hours;
      ii) enabling said second heating means and disabling said first heating means during a first portion of said off-peak hours; and
      iii) enabling said first heating means and disabling said second heating means during a second portion of said off-peak power hours.

2. The hot water system of claim 1, further comprising means in said second hot water tank for maintaining a predetermined temperature of said water when said second heating means is disabled.

3. The hot water system of claim 1, further comprising thermostat means in each of said first hot water tank and said second hot water tank for regulating operation of said first heating means and said second heating means to maintain a predetermined water temperature in each of said tanks.

4. The hot water system of claim 3, wherein said controller means comprises one of either a microprocessor, electronic timer or mechanical timer for selectively enabling and disabling said thermostat means.

5. The hot water system of claim 1, further comprising means for vertically stacking said plurality of hot water tanks.

6. The hot water system of claim 5, wherein said means for vertically stacking comprises a plurality of protrusions projecting from a bottom surface of said first hot water tank and a plurality of cooperatively shaped indentations in a top surface of said second hot water tank adapted to receive respective ones of said plurality of protrusions.

7. The hot water system of claim 1, further comprising a water metering device connected to said controller means for generating a signal to said controller means indicative of water consumption.

8. The hot water system of claim 7, wherein said controller means includes means for receiving said signal from said water metering device and, in the event said signal indicates that no water has been consumed over a predetermined time period, then disabling said first heating means and said second heating means.

9. In a hot water system for connection to a water supply and a local hot water usage system, said hot water system including a plurality of hot water storage tanks, each one of said plurality of tanks being provided with heating means, a first predetermined one or more of said tanks being connected in seriatim to said water supply for receiving water therefrom, a further predetermined one or more of said tanks being connected in seriatim to said local hot water usage system for discharging water thereto, and said first predetermined one or more of said tanks being connected to said further predetermined one or more of said tanks such that water flows through said plurality of said tanks from said water supply to said hot water usage system, a method for controlling operation of said plurality of hot water tanks for heating water therein, comprising the steps of:

a) disabling said heating means in each of said tanks during peak power consumption hours, b) enabling said heating means in each of said further predetermined one or more of said tanks and disabling said heating means in each of said first predetermined one or more of said tanks during a first portion of said off-peak hours; and c) enabling said heating means in each of said first predetermined one or more of said tanks and disabling said heating means in each of said further predetermined one or more of said tanks during a second portion of said off-peak power hours.

10. The method of claim 9, further comprising the step of maintaining a predetermined temperature of said water in said further predetermined one or more of said tanks when said heating means in said further predetermined one or more of said tanks are disabled.

11. The method of claim 9, further comprising the steps of activating and de-activating said heating means in each of said tanks while said heating means are enabled for selectively regulating water temperature therein.

* * * * *